(12) United States Patent
Wubbena et al.

(10) Patent No.: US 7,340,365 B2
(45) Date of Patent: Mar. 4, 2008

(54) METHOD AND APPARATUS FOR VERIFYING THE OPERATION OF A PLURALITY OF TEST SYSTEM INSTRUMENTS

(75) Inventors: William Hobson Wubbena, Fort Collins, CO (US); Carl Benvenga, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 301 days.

(21) Appl. No.: 10/831,379

(22) Filed: Apr. 23, 2004

(65) Prior Publication Data

US 2005/0240373 A1 Oct. 27, 2005

(51) Int. Cl.
*G01R 19/00* (2006.01)
*G06F 19/00* (2006.01)

(52) U.S. Cl. .................. 702/121; 702/109; 702/122; 324/537

(58) Field of Classification Search ............. 702/121, 702/118, 122, 109; 324/537, 527; 73/1.01
See application file for complete search history.

(56) References Cited

U.S. PATENT DOCUMENTS

| | | | | |
|---|---|---|---|---|
| 4,326,162 A | * | 4/1982 | Hankey | 324/542 |
| 4,329,643 A | * | 5/1982 | Neumann et al. | 324/763 |
| 4,690,475 A | * | 9/1987 | McElroy | 439/502 |
| 4,884,033 A | * | 11/1989 | McConchie, Sr. | 324/503 |
| 5,739,694 A | * | 4/1998 | Grochulski | 324/556 |
| 6,104,988 A | * | 8/2000 | Klarer | 702/183 |
| 6,429,544 B1 | * | 8/2002 | Sasaki et al. | 307/10.1 |
| 2004/0021471 A1 | * | 2/2004 | Ngo | 324/548 |

* cited by examiner

*Primary Examiner*—John Barlow
*Assistant Examiner*—Hien Vo (57) ABSTRACT

In a method for verifying the operation of a plurality of test system instruments, a harness cable is electrically coupled to a plurality of test signal ports on the plurality of test system instruments. A first plurality of test measurements are then initiated via the harness cable, with the first plurality of test measurements being made between two or more sets of test ports that are on three or more of the instruments. The plurality of test measurements are captured from the test system instruments using a computer. The computer then indicates to a user whether ones of the plurality of test measurements are within defined ranges. A second plurality of test measurements, between ones of the plurality of test instruments and a test module, may also be initiated via the harness cable. Exemplary harness cable embodiments are also disclosed.

15 Claims, 7 Drawing Sheets

METHOD AND APPARATUS FOR VERIFYING THE OPERATION OF A PLURALITY OF TEST SYSTEM INSTRUMENTS

BACKGROUND OF THE INVENTION

A plurality of test system instruments, some of which may be signal sources and some of which may be measurement instruments, may be coupled to a device under test (DUT) for the purpose of stimulating and/or measuring characteristics of the DUT. However, prior to acquiring meaningful measurements from the DUT, a user must verify the operation of each of the instruments to which it is connected. That is, the user must verify that the signals generated by (or measurements produced by) each instrument can be trusted and are reliable. In the past, the user might have done this by writing a custom computer program. Writing the custom program might have taken hours or even days and, in the end, the program would not have been applicable to a different configuration of instruments. Further, the user might first have had to verify that a device under test was "known good", and then couple and decouple leads of the instruments to the DUT during execution of the custom program.

SUMMARY OF THE INVENTION

One aspect of the invention is embodied in a method for verifying the operation of a plurality of test system instruments. In accordance with the method, a harness cable is electrically coupled to a plurality of test signal ports on the plurality of test system instruments. A plurality of test measurements are then initiated via the harness cable, with the plurality of test measurements being made between two or more sets of test ports that are on three or more of the instruments. The plurality of test measurements are captured from the test system instruments using a computer. The computer then indicates to a user whether ones of the plurality of test measurements are within defined ranges.

Another aspect of the invention is embodied in apparatus comprising a test module and a harness cable. The harness cable has 1) a first plurality of signal routes extending between the test module and a switch interface, and 2) a second plurality of signal routes extending between the switch interface and a plurality of electrical connectors. The electrical connectors are configured to mate with a plurality of test signal ports on a plurality of test system instruments.

Yet another aspect of the invention is also embodied in apparatus comprising a test module and a harness cable. The harness cable has a plurality of signal routes extending between the test module and a plurality of electrical connectors, with the electrical connectors being configured to mate with a plurality of test signal ports on a plurality of test system instruments.

Other embodiments of the invention are also disclosed.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
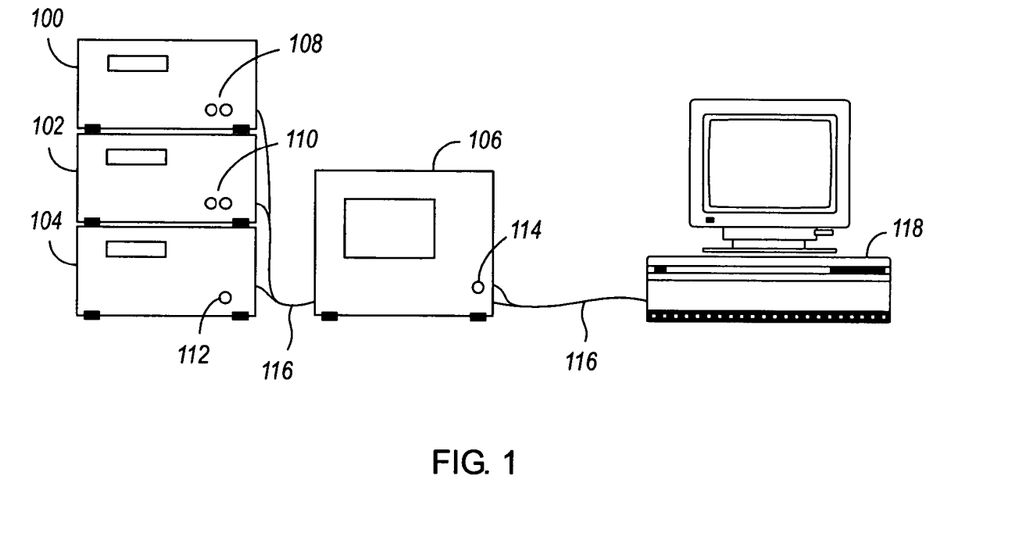
FIG. 1 illustrates a plurality of test system instruments, coupled to a computer.

FIG. 1 illustrates a plurality of test system instruments 100, 102, 104, 106. By way of example, the test system instruments 100-106 comprise a function generator 100, a voltmeter 102, a power supply 104, and an oscilloscope 106. However, the test system instruments could alternately or additionally comprise an arbitrary waveform generator, counter, multimeter, or other instrument.

In general, the various test system instruments 100-106 may take one of two forms: signal source or measurement instrument. Thus, in the collection of instruments shown in FIG. 1, the function generator 100 and power supply 104 would be signal sources; and the voltmeter 102 and oscilloscope 106 would be measurement instruments.

Some or all of the instruments may have a number of test signal ports 108, 110, 112, 114. For example, the function generator 100 may have pairs of banana plug receptacles 108 at which the function generator 100 may output a programmed waveform. Similarly, the oscilloscope 106 may have one or more BNC connectors 114 through which it may receive monitored waveforms from a device under test (DUT).

Although each of the instruments 100-106 may have various controls (e.g., buttons, dials or sliders) that allow a user to manually configure the instrument, each instrument 100-106 may also have a communication interface such as a GPIB (general purpose instrument bus), USB (universal serial bus) or LAN (local area network) interface. By means of GPIB, USB or LAN cables 116, the instrument's communication interfaces may be coupled to an adjacent or remote computer 118. By means of SCPI (Standard Commands for Programmable Instrumentation) or other protocols, a user of the computer 118 may configure the instruments 100-106, cause signal sources 100, 104 to generate signals, and cause measurement instruments 102, 106 to capture responses from a DUT to which the test signal ports 108-114 of the instruments 100-106 are connected.

Prior to acquiring meaningful measurements from a DUT, a user must verify the operation of each of the instruments 100-106. That is, the user must verify that the signals generated by (or measurements produced by) each instrument can be trusted and are reliable. In the past, the user might have done this by writing a custom program for the computer 118. Writing the custom program might have taken hours or even days and, in the end, the program would not have been applicable to a different configuration of instruments. Further, the user might first have had to verify that a DUT was "known good", and then couple and decouple leads of the instruments 100-106 to the DUT during execution of the custom program.

Figure 2:
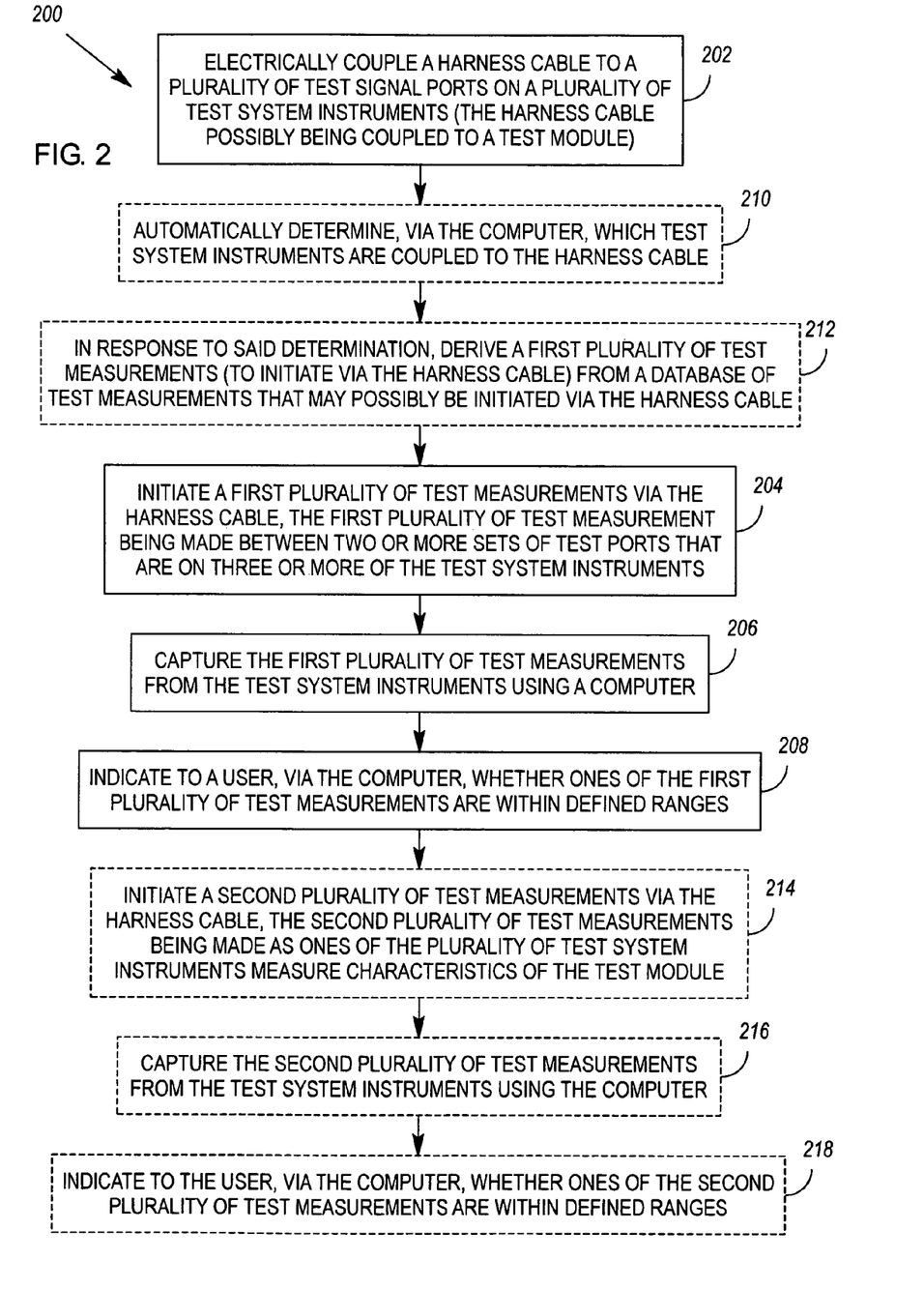
FIG. 2 illustrates an exemplary method for verifying the operation of a plurality of test system instruments such as those that are shown in FIG. 1.

FIG. 2 illustrates a new, simplified method 200 for verifying the operation of a plurality of test system instruments such as those that are shown in FIG. 1. The method 200 comprises electrically coupling 202 a harness cable to a plurality of test signal ports on the plurality of test system instruments. A plurality of test measurements are then initiated 204 via the harness cable, with the plurality of test measurements being made between two or more sets of test ports that are on three or more of the instruments. By way of example, the test measurements may be initiated by a computer that is connected to the instruments. The plurality of test measurements are then captured 206 from the test system instruments using the computer; and the computer indicates 208 to a user whether ones of the plurality of test measurements are within defined ranges.

In one variation of method 200, the computer automatically determines 210 which instruments are coupled to the harness cable. In response to this determination, the computer may derive 212 the plurality of test measurements that will actually be initiated via the harness cable from a database of test measurements that may possibly be initiated via the harness cable.

In another variation of method 200, a test module may be coupled to the harness cable. The test module may be coupled to the harness cable before, during or after the actions 202-212 of method 200. If the test module is present, the method 200 may continue with the initiation 214 of a second plurality of test measurements via the harness cable. In contrast to the first plurality of test measurements, the second plurality of test measurements are made as ones of the plurality of test system instruments measure characteristics of the test module. The second plurality of test measurements may also be captured 216 from the test system instruments using the computer; and the computer may then indicate 218 to the user whether ones of the second plurality of test measurements are within defined ranges.

Before describing the method 200 further, or describing some of the particular measurement tests that it may initiate, some alternate embodiments of the harness cable employed by the method 200 will be described.

Figure 3:
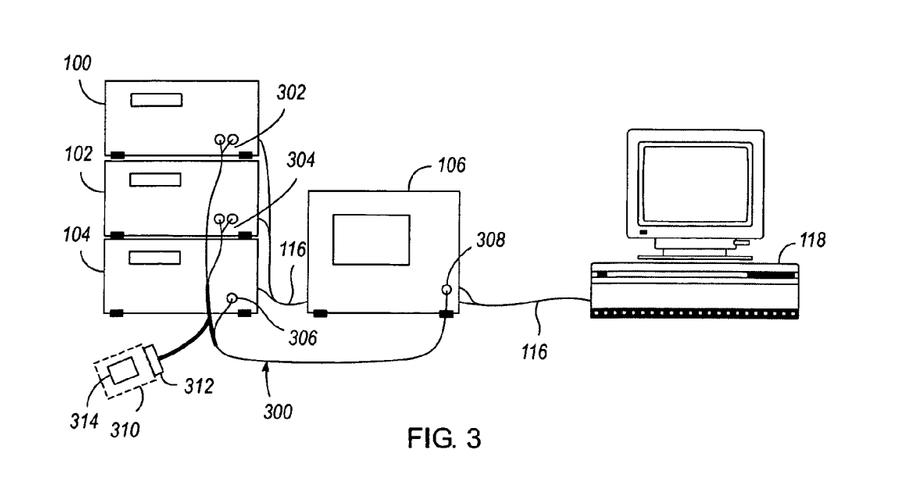
FIG. 3 illustrates the coupling of an exemplary harness cable and test module to the instruments shown in FIG. 1.

FIG. 3 illustrates the construction and use of a first exemplary embodiment of a harness cable 300 for verifying the operation of a plurality of test system instruments 100-106. As shown, the harness cable 300 comprises a plurality of signal routes that terminate at a plurality of electrical connectors 302, 304, 306, 308. The electrical connectors 302-308 are configured to mate with a plurality of test signal ports 108-114 on a plurality of test system instruments 100-106. Note, however, that a particular configuration of instruments may dictate that some of the connectors 108-114 are not used. For example, if the oscilloscope 106 shown in FIG. 3 were not present, the connector 308 that is shown to be coupled to the oscilloscope 106 might not be coupled to anything. Note also that the test system instruments 100-106 may comprise a mix of both signal sources 100, 104 and measurement instruments 102, 106.

In one embodiment of the harness cable 300a (FIG. 4), the signal routes of the harness cable are merely tied together (i.e., tied together at a common electrical node). Optionally, a test module 310 may be coupled to the harness cable 300a. The test module 310 may be fixedly attached to the harness cable 300a, or detachably connected to the harness cable via a connector 312.

Figure 4:
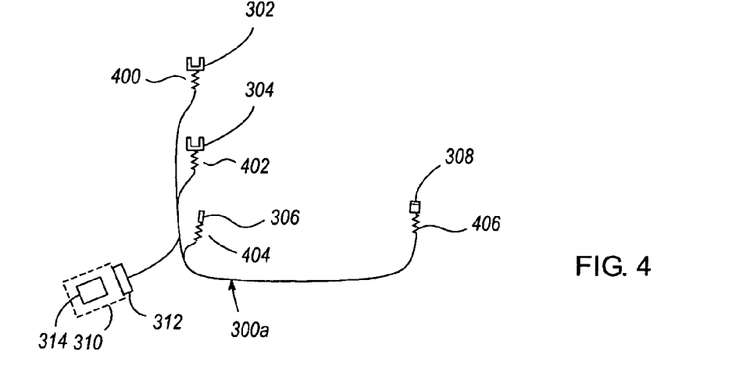
FIGS. 4-9 illustrate various alternate embodiments of the harness cable and test module shown in FIG. 3.

To prevent the instruments 100-106 and test module 310 from damaging each other, a number of current limiting impedances 400, 402, 404, 406 may be incorporated into some or all of the routes of the harness cable 300a.

The test module 310 may comprise various combinations of active or passive circuit components. In one embodiment, the test module 310 is capable of generating a waveform (e.g., a sinewave) that may be output to the harness cable 300a. Further, the test module 310 may be powered by an on-board battery 314 (or batteries 314), and the voltage(s) of battery 314 (or batteries 314) may be output to the harness cable 300a. If the computer 118 is programmed to understand the characteristics of the test module 310, it may initiate a number of test measurements to verify whether measurement instruments 102,106 coupled to the harness cable 300a can accurately measure the test module's characteristics.

In another embodiment of the harness cable 300b (FIG. 5), the signal routes of the harness cable extend between the plurality of electrical connectors 302-308 and a test module 500. As with the test module embodiment shown in FIG. 4, the test module 500 may be fixedly attached to the harness cable 300b, or detachably connected to the harness cable 300b via a connector 312.

Figure 5:
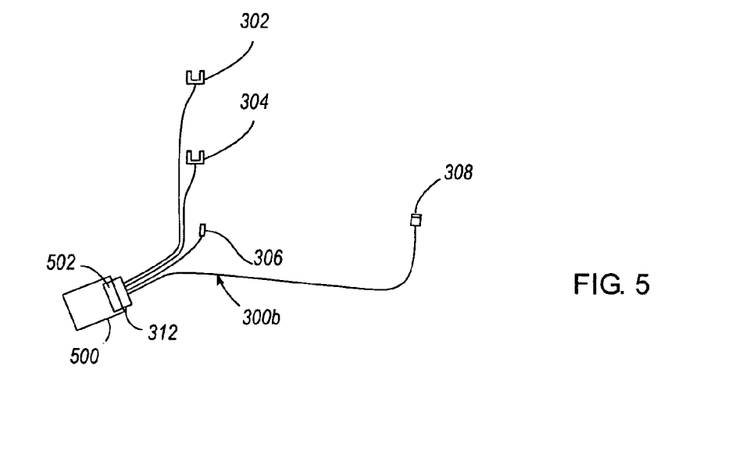

Current limiting impedances may also be incorporated into some or all of the routes of the harness cable 300b. Alternately, current limiting impedances 502 may be included within the test module 500 (e.g., on a printed circuit board of the test module 500, at which some or all of the harness cable's signal routes are terminated).

The characteristics of the test module 500 may be the same as (or different from) those of the test module 310 shown in FIG. 4. However, in one embodiment of the test module 500, the test module comprises circuitry for generating at least N functions representing linearly independent combinations of the plurality of signal sources 100, 104 that may be coupled to the harness cable 300b. From Cramer's Rule of linear algebra, it is known that if N is greater than or equal to the number of signal sources 100, 104 that may be coupled to the harness cable 300b, it is possible to solve for all of the signal sources 100, 104. Further, since the signals sources 100, 104 are under a computer's programmatic control (and assuming that the test module 500 is "good"), it is possible to verify and detect which of the harness cable's signal sources 100, 104 and/or measurement instruments 102, 106 are operating correctly.

In another embodiment of the harness cable 300c and test module 600 (see FIG. 6), the test module comprises a switching network 602, and the harness cable 300c connects to the test module 600 via the switching network 602. The harness cable 300c may then comprise a second plurality of signal routes that extend between the switching network 602 and a switch programming interface 604. Alternately, the test module 700 itself may comprise an interface 702 for programming the switching network 602 (see, e.g., the test module 700 and harness cable 300d in FIG. 7). The programming interfaces 604, 702 may then be coupled to the computer 118 so that the computer 118 may program the switching network 602 and determine which of the test system instruments 100-106 and/or signals of the test module 600, 700 are coupled during the initiation of a given test measurement. By way of example, the each of the programming interfaces 604, 702 could comprise a USB port.

Figures 6, 7, 8, 9:
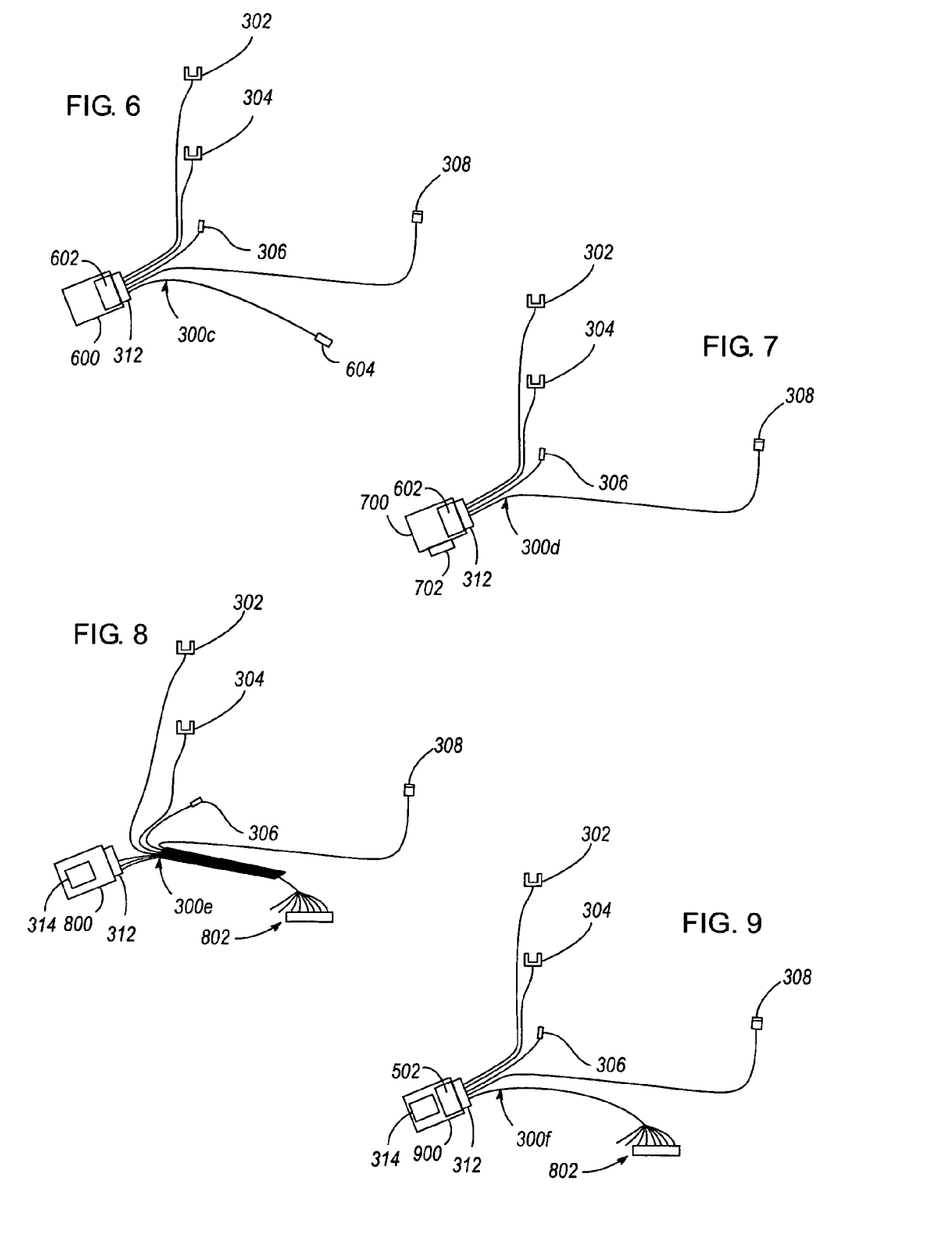

FIGS. 8 & 9 illustrate the construction and use of yet additional exemplary embodiments of harness cables 300e, 300f for verifying the operation of a plurality of test system instruments 100-106. As shown, the harness cables 300e, 300f each comprise a first plurality of signal routes that extend between a test module 800, 900 and a switch interface 802. The harness cables 300e, 300f also comprise a second plurality of signal routes that extend between the switch interface 802 and a plurality of electrical connectors 302-308.

As with the test module embodiment 310 shown in FIG. 4, the test modules 800, 900 may be fixedly attached to their harness cables 300e, 300f, or detachably connected to their harness cables 300e, 300f via a connector 312.

The test modules 800, 900 may comprise various combinations of active or passive circuit components. In one embodiment, the test modules 800, 900 are each capable of generating a waveform (e.g., a sinewave) that may be output to a harness cable 300e, 300f. Further, each test module 800, 900 may be powered by an on-board battery 314 (or batteries 314), and the voltage(s) of battery 314 (or batteries 314) may be output to the harness cable 300e, 300f. If the computer 118 is programmed to understand the characteristics of the test modules 800, 900, it may initiate a number of test measurements to verify whether measurement instruments 100-106 coupled to the harness cables 300e, 300f can accurately measure the test module's characteristics.

Note that the harness cables 300e, 300f and test modules 800, 900 do not include switching networks. Rather, the signal routes that are coupled to electrical connectors 302-308 merely bypass the test module 800 (as shown in FIG. 8), or are passed through the test module 900 for the purpose of incorporating current limiting impedances 502 (as shown in FIG. 9). Alternately, current limiting impedances may be incorporated into the harness cables 300e, 300f themselves.

Figure 10:
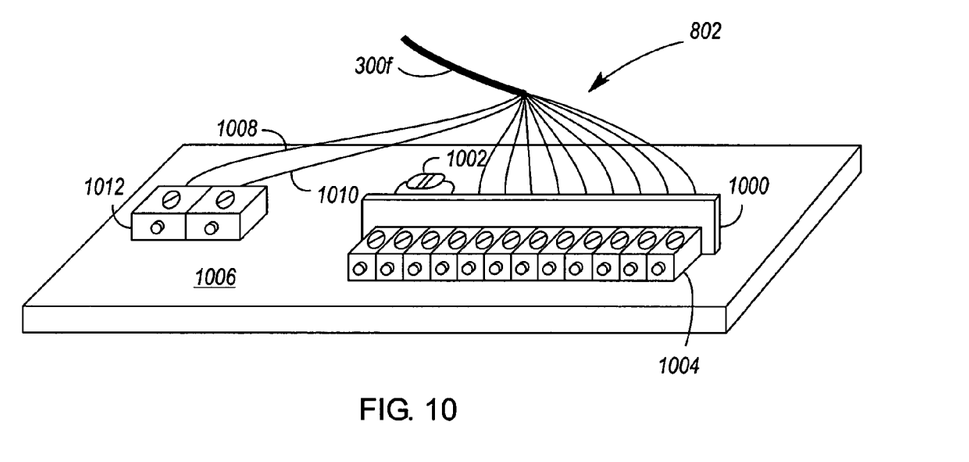
FIG. 10 illustrates an exemplary embodiment of the switch interface shown in FIGS. 8 & 9.

Given that the test modules 800, 900 do not include switching networks, signal routes of their attached harness cables 300e, 300f may present at a switch interface 802. The switch interface 802 may take various forms and comprise various components. By way of example, FIG. 10 shows the switch interface 802 to comprise a circuit board 1000 to which the signal routes of the harness cable 300f connect, and a presence detect resistor 1002 coupled between two contacts of the circuit board 1000. The presence detect resistor 1002 may be sensed to determine whether circuit board 1000 is actually coupled to a terminal block 1004 of a switching network 1006. FIG. 10 also shows the switch interface 802 to comprise a pair of high and low "common" wires 1008, 1010 (both of which may be coupled to the test module 900 via the harness cable 3000. In use, and by way of example, the components of the switch interface 802 shown in FIG. 9 may be coupled to terminal blocks 1004, 1012 of a switching network 1006 such as the Agilent Technologies 44470D 20-Channel Relay Multiplexer Module that is controlled by an Agilent 3499 Switchbox. Alternately, the FIG. 10 switch interface 802 could be coupled to an Agilent 34901A 20-Channel Relay Multiplexer Module that is controlled by an Agilent 34970A Switchbox. Both of the Agilent Switchboxes may, in turn, be controlled by the computer 118. Agilent Technologies, Inc. is a United States corporation having its principal place of business in Palo Alto, Calif.

Given that various of the harness cables disclosed herein are coupled to switching networks, the method 200 (FIG. 2) may further comprise programming the switching networks. For example, between at least some of the test measurements that are conducted between the test system instruments, a switching network may be programmed to couple different ones of the plurality of test system instruments to each other, thereby eliminating the load and noise of other instruments during the initiation of a particular test measurement. Similarly, a switching network could be programmed between at least some of the test measurements that involve a test module, thereby causing different measurement instruments (and possibly signal sources) to be coupled to the test module. Alternately, a switching network could merely be programmed to couple or decouple all of the measurement instruments (and possibly signal sources) to the test module.

Figure 11:
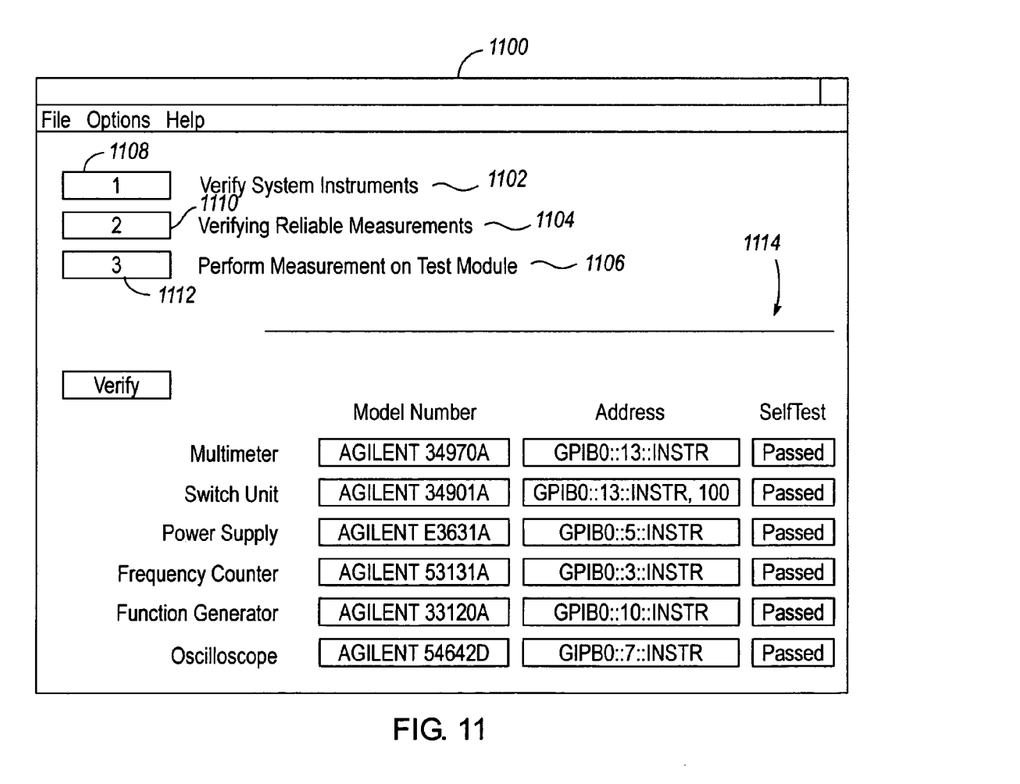
FIGS. 11-13 illustrate various exemplary screens of a user interface that the computer shown in FIGS. 1 & 3 may present to a user.
Figure 12:
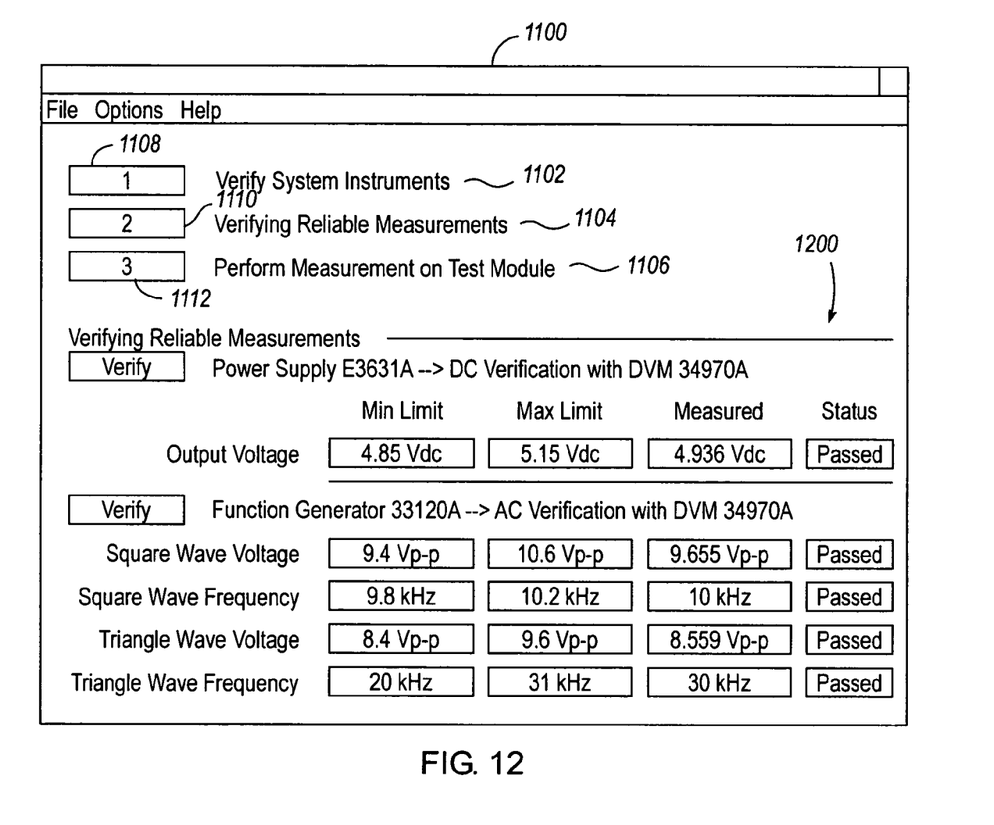
Figure 13:
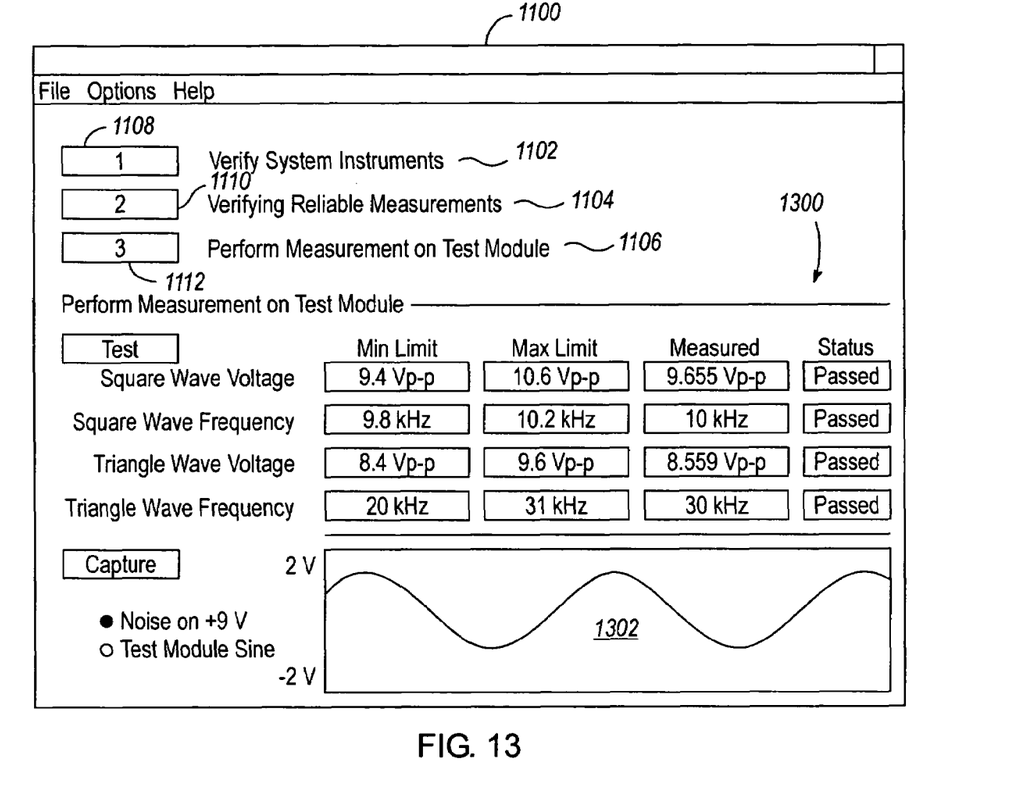

FIGS. 11-13 illustrate various exemplary screens of a user interface 1100 that the computer 118 may present to a user. By way of example, the screens provide the user with at least three options 1102, 1104, 1106 for verifying the operation of a plurality of test system instruments 100-106. In one embodiment, the options 1102-1106 are enabled sequentially.

The first option 1102 (selectable by a first button 1108 of a graphical user interface (GUI) 1100) is an option to query one or more of the test system instruments 100-106 to determine whether a harness cable (e.g., 300) is properly coupled to the test system instruments 100-106. An exemplary response 1114 to the user's selection of this option is shown in FIG. 11, wherein a list of instruments is provided, along with model numbers, addresses, and self-test results for each instrument. There are various known methods for detecting instruments 100-106 and acquiring the information shown in FIG. 11. These methods are not pertinent to the invention and will not be discussed herein.

The second option 1104 that the computer 118 may present to a user (selectable by a second button 1110 of a GUI 1100), is an option to initiate one or more test measurements between the test system instruments 100-106 identified after selection of the first option 1102. An exemplary response 1200 to the user's selection of this option is shown in FIG. 12, wherein combinations of instruments that may be tested against each other are identified along with a number of test measurements that may be made with each instrument combination. By way of example, each test measurement is summarized by name, minimum and maximum limits, result, and status (e.g., pass or fail). The tests measurements made, as well as their minimum and maximum limits, may be derived from a database of possible test measurements maintained by the computer 118 (or computer readable media that is accessible to the computer).

The third option 1106 that the computer 118 may present to a user (selectable by a third button 1112 of a GUI 1100), is an option to initiate one or more test measurements involving a test module (e.g., 310). An exemplary response 1300 to the user's selection of this option is shown in FIG. 13, and is similar in nature to the response shown in FIG. 12. The response in FIG. 13 further provides a user with the option to capture an oscilloscope's image 1302 of a waveform generated by the test module 310.

Assuming, for example, that the instruments coupled to a harness cable comprise a function generator, a DC power supply, a multimeter, a counter and an oscilloscope, the above methods and apparatus might initiate the following test measurements.

After a user's selection of option two 1104 (FIG. 12), a DC verification of the power supply may be initiated. To do this, the computer 118 may cause the power supply to output an average of the minimum and maximum limits displayed in FIG. 12. After giving the power supply's output voltage time to settle, the computer may cause the power supply to be coupled to the multimeter, and the multimeter may be caused to measure the power supply's output voltage. The computer may then capture the measured output voltage, enter it in the appropriate box of the FIG. 12 GUI, compare it to the minimum and maximum limits, and set the pass/fail status for the measurement.

Next, an AC verification of the function generator may be initiated. To do this, the computer 118 may cause the function generator to output a square wave with a peak-to-peak amplitude equal to the average of the minimum and maximum limits displayed following "Square Wave Voltage" in FIG. 12, a frequency equal to the average of the minimum and maximum limits displayed following "Square Wave Frequency", and up to 2.5 volts of DC offset. The output signal of the function generator is then allowed to settle before the computer causes the function generator to be coupled to the multimeter. The computer then causes the multimeter to measure the function generator's AC output voltage. Next, the computer captures the measured voltage, multiplies it by 2.0 to convert it to a peak-to-peak reading, enters the result in the appropriate box of the FIG. 12 GUI, compares it to the minimum and maximum limits, and sets the pass/fail status for the measurement. A similar procedure may then be carried out with the function generator outputting a triangle wave.

After a user's selection of option three 1106 (FIG. 13), the computer 118 may cause a negative DC battery voltage of the test module to be read by the multimeter. The computer may then cause a positive DC voltage of the test module to be read by the multimeter. Assuming that the test module is capable of generating a sinewave, the computer may then cause the AC voltage of the sinewave to be read by the multimeter. Thereafter, the computer may couple the sinewave output of the test module to the counter to thereby determine the frequency of the sinewave. All of the results may then be entered into the appropriate boxes of the FIG. 13 display, and pass/fail statues may be set as appropriate. Finally, the computer may cause the oscilloscope to capture an image of the test module's sinewave, or noise on one of the test module's battery voltages, as selected by a user.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for verifying the operation of a plurality of test system instruments, comprising:
   electrically coupling a harness cable to a plurality of test signal ports on the plurality of test system instruments;
   initiating a first plurality of test measurements via the harness cable, the first plurality of test measurements being made between two or more sets of test ports that are on three or more of the test system instruments;
   capturing the first plurality of test measurements from the test system instruments using a computer; and
   indicating to a user, via the computer, whether ones of the first plurality of test measurements are within defined ranges, wherein the harness cable is electrically coupled to a switching network, the method further comprising:
   between at least some of the first plurality of test measurements, programming the switching network to couple different ones of the plurality of test system instruments to each other.

2. A method for verifying the operation of a plurality of test system instruments, comprising:
   electrically coupling a harness cable to a plurality of test signal ports on the plurality of test system instruments;
   initiating a first plurality of test measurements via the harness cable, the first plurality of test measurements being made between two or more sets of test ports that are on three or more of the test system instruments;
   capturing the first plurality of test measurements from the test system instruments using a computer; and
   indicating to a user, via the computer, whether ones of the first plurality of test measurements are within defined ranges, wherein the harness cable is coupled to a test module, the method further comprising:
   initiating a second plurality of test measurements via the harness cable, the second plurality of test measurements being made as ones of the plurality of test system instruments measure characteristics of the test module;
   capturing the second plurality of test measurements from the test system instruments using the computer; and
   indicating to the user, via the computer, whether ones of the second plurality of test measurements are within defined ranges.

3. The method of claim 2, further comprising:
   via the computer, presenting the user an interface providing at least three options, including:
      an option to query one or more of the test system instruments to determine whether the harness cable is properly coupled to the test system instruments;
      an option to initiate one or more of the first plurality of test measurements;
      an option to initiate one or more of the second plurality of test measurements; and
      in response to the user's selection of each option, using the presented interface to provide the user with feedback on the selected option.

4. The method of claim 2, wherein the harness cable is electrically coupled to a switching network, the method further comprising:
   between at least some of the second plurality of test measurements, programming the switching network to couple different ones of the plurality of test system instruments to the test module.

5. The method of claim 2, wherein the plurality of test system instruments comprises a number of measurement instruments, and wherein the harness cable is electrically coupled to a switching network, the method further comprising:
   before initiating the second plurality of test measurements, programming the switching network to couple the number of measurement instruments to the test module.

6. A method for verifying the operation of a plurality of test system instruments, comprising:
   electrically coupling a harness cable to a plurality of test signal ports on the plurality of test system instruments;
   initiating a first plurality of test measurements via the harness cable, the first plurality of test measurements being made between two or more sets of test ports that are on three or more of the test system instruments;
   capturing the first plurality of test measurements from the test system instruments using a computer; and
   indicating to a user, via the computer, whether ones of the first plurality of test measurements are within defined ranges, the method further comprising:
   after coupling the harness cable, but before initiating test measurements via the harness cable, automatically determining, via the computer, which test system instruments are coupled to the harness cable; and
   in response to the determination, derive the first plurality of test measurements from a database of test measurements that may possibly be initiated via the harness cable.

7. Apparatus for verifying the operation of a plurality of test system instruments, comprising:
   a test module; and
   a harness cable having i) a first plurality of signal routes extending between the test module and a switch interface, and ii) a second plurality of signal routes extending between the switch interface and a plurality of electrical connectors, the electrical connectors being configured to mate with a plurality of test signal ports on a plurality of test system instruments, wherein the test module comprises a number of current limiting impedances, the current limiting impedances being connected to limit currents in a number of the second plurality of signal routes.

8. The apparatus of claim 7, wherein the first plurality of signal routes of the harness cable terminate in a connector that is detachably connected to the test module.

9. The apparatus of claim 7, wherein the switch interface comprises i) a circuit board to which one or more of the signal routes of the harness cable connect, and ii) a presence detect resistor coupled between contacts of the circuit board.

10. The apparatus of claim 7, wherein the test module comprises circuitry for generating at least two functions representing linearly independent combinations of a plurality of signal sources, and wherein the circuitry is coupled to the electrical connectors of the harness cable.

11. The apparatus of claim 7, wherein the test module comprises a switching network, and wherein the harness cable connects to the test module via the switching network.

12. The apparatus of claim 11, wherein the harness cable further comprises a second plurality of signal routes extending between the switching network and a switch programming interface.

13. The apparatus of claim 7, wherein the test module comprises an on-board battery, and wherein a voltage of the battery is output over one of the plurality of signal routes.

14. The apparatus of claim 7, wherein the plurality of signal routes of the harness cable terminate in a connector that is detachably connected to the test module.

15. Apparatus for verifying the operation of a plurality of test system instruments, comprising:
a test module; and
a harness cable having a plurality of signal routes extending between the test module and a plurality of electrical connectors, the electrical connectors being configured to mate with a plurality of test signal ports on a plurality of test system instruments, wherein the test module comprises a number of current limiting impedances, the current limiting impedances being connected to limit currents in a number of the plurality of signal routes.

* * * * *

UNITED STATES PATENT AND TRADEMARK OFFICE
CERTIFICATE OF CORRECTION

| | |
|---|---|
| PATENT NO. | : 7,340,365 B2 |
| APPLICATION NO. | : 10/831379 |
| DATED | : March 4, 2008 |
| INVENTOR(S) | : Wubbena et al. |

Page 1 of 1

It is certified that error appears in the above-identified patent and that said Letters Patent is hereby corrected as shown below:

In column 9, line 20, in Claim 10, delete "hamess" and insert -- harness --, therefor.

In column 10, line 9, in Claim 14, delete "hamess" and insert -- harness --, therefor.

Signed and Sealed this

Fifteenth Day of July, 2008

JON W. DUDAS
*Director of the United States Patent and Trademark Office*